United States Patent
Ehbets et al.

(10) Patent No.: US 7,755,773 B2
(45) Date of Patent: *Jul. 13, 2010

(54) SCANNER DEVICE

(75) Inventors: Peter Ehbets, Zurich (CH); Adrian Kohlbrenner, Thalwil (CH)

(73) Assignee: X-Rite Europe GmbH, Regensdorf (CH)

( * ) Notice: Subject to any disclaimer, the term of this patent is extended or adjusted under 35 U.S.C. 154(b) by 123 days.

This patent is subject to a terminal disclaimer.

(21) Appl. No.: 11/961,507

(22) Filed: Dec. 20, 2007

(65) Prior Publication Data

US 2008/0174788 A1 Jul. 24, 2008

(30) Foreign Application Priority Data

Dec. 21, 2006 (EP) .................................. 06126912

(51) Int. Cl.
G01B 11/14 (2006.01)
(52) U.S. Cl. ...................................... 356/614; 356/402
(58) Field of Classification Search ......... 356/614–623, 356/328, 406, 419, 402, 407, 73, 416, 417
See application file for complete search history.

(56) References Cited

U.S. PATENT DOCUMENTS

| | | | |
|---|---|---|---|
| 4,081,215 A | 3/1978 | Penney et al. | |
| 4,707,138 A * | 11/1987 | Coatney | 356/402 |
| 5,043,571 A | 8/1991 | Hasegawa | |
| 5,144,498 A | 9/1992 | Vincent | |
| 5,592,294 A | 1/1997 | Ota et al. | |
| 6,008,905 A | 12/1999 | Breton et al. | |
| 6,028,682 A | 2/2000 | Ott et al. | |
| 6,844,931 B2 * | 1/2005 | Ehbets | 356/328 |

(Continued)

FOREIGN PATENT DOCUMENTS

DE 3041375 6/1982

(Continued)

OTHER PUBLICATIONS

European Search Report dated Feb. 4, 2007.

(Continued)

*Primary Examiner*—Hoa Q Pham
(74) *Attorney, Agent, or Firm*—McCarter & English, LLP

(57) ABSTRACT

A scanner device for measuring the color properties of a measured object pixel by pixel has a support surface for the measured object, a color measuring head, a drive unit for moving the color measuring head above the support surface in at least one dimension thereof and for adjusting the height of the color measuring head in the direction perpendicular to the support surface, as well as a measurement and drive control unit which activates the drive unit and co-operates with the color measuring head. It is also equipped with an electronic distance control system which adjusts the distance of the color measuring head above the measurement point in the direction perpendicular to the support surface to a desired measuring distance for every measurement point by means of the drive unit. The electronic distance control system works with measurement values generated by the color measuring head and distance values computed from them. The scanner device is suitable for running high-precision measurements on even the smallest measurement fields without contact and no separate measurement sensor is needed for the distance control system.

10 Claims, 4 Drawing Sheets

U.S. PATENT DOCUMENTS

| | | |
|---|---|---|
| 2003/0169421 A1 | 9/2003 | Ehbets |
| 2006/0001739 A1 | 1/2006 | Babayoff |
| 2006/0132777 A1 | 6/2006 | Hubble, III et al. |
| 2006/0192957 A1 | 8/2006 | Frick et al. |
| 2006/0192963 A1 | 8/2006 | Frick |
| 2006/0193512 A1 | 8/2006 | Orelli et al. |
| 2008/0174763 A1* | 7/2008 | Ehbets et al. .............. 356/51 |

FOREIGN PATENT DOCUMENTS

| | | |
|---|---|---|
| EP | 1185077 | 3/2002 |
| JP | 57166530 | 10/1982 |
| JP | 6235660 | 8/1994 |
| JP | 10160573 | 6/1998 |
| JP | 2001264173 | 9/2001 |
| WO | 2006/045620 | 5/2006 |
| WO | 2006/045621 | 5/2006 |

OTHER PUBLICATIONS

European Search Report dated May 25, 2007.
European Search Report dated Sep. 7, 2007.
U.S. Appl. No. 11/958,608, entitled "Spectral Photoelectric Measurement Transformer" (filed Dec. 18, 2007), Inventor: Peter Ehbets.
U.S. Appl. No. 11/961,456, entitled "Color Measuring Head and Scanner Device Equipped Therewith" (filed Dec. 20, 2007), Inventor: Peter Ehbets and Adrian Kohlbrenner.

* cited by examiner

SCANNER DEVICE

BACKGROUND OF THE INVENTION

The invention relates to a scanner device for measuring the color properties of a measured object pixel by pixel by means of a color measuring head of the type with a support surface for the measured object and a drive unit for moving the color measuring head above the support surface in at least one dimension thereof and for adjusting the height of the color measuring head in the direction perpendicular to the support surface, and having a measurement and drive control unit which activates the drive unit and co-operates with the color measuring head.

Published international patent application WO 2006/045621 A1 provides a detailed description of an automated measuring system for quality control and for controlling the color of a printing machine. It essentially comprises a measuring table on which a printed sheet to be measured can be placed, and a measuring unit comprising a beam-shaped line scanner and an individual color measuring head. The line scanner and individual measuring head can be moved above the measuring table by a computer-controlled drive mechanism so that it travels across every pixel of the printed sheet to be measured. The quality and control parameters needed for the printing process are derived from the resultant measurement values. The output parameters generally include color measurement values CIE XYZ and derived calorimetric variables (in accordance with CIE publication 15 and ISO 13655) as well as density measurement values in accordance with ISO 5. The individual measuring head is advantageously provided in the form of a spectral measuring head so that all the output parameters can be computed in a known manner from the measured spectral values of the reflection factor. As a rule, the individual measuring head is used to measure print control strips contained in the printed sheet, whilst the line scanner is used to scan the rest of the printed image content.

The size of the measurement field in the print control strip is tending to become increasingly small, on the one hand in order to save on waste and on the other hand to enable more measurement fields to be provided in the print control strip and control more printing systems with one strip.

Measuring small measurement fields cleanly at a high scanning speed requires a more complex design of measuring optics than is available in the prior art. Parameters such as the sensitivity to distance and positioning accuracy of the measuring head must satisfy significantly higher requirements. Allowance must also be made for the homogeneity of the measurement fields if working with small measuring orifices.

Since it is necessary to measure freshly printed print samples, it is important to have a geometry which hovers freely. The design of the measuring system must be such that it can be adapted to different paper thickness and take account of fluctuations in the planarity of the sample bed.

To obtain highly accurate measurements, it is extremely important that the peripheral distance between the illuminating and measuring speckles of the color measuring head on the measured object is kept as small as possible. In the case of the 45°/0° measuring geometry used as standard, the size of the peripheral distance depends on the sum of all variances occurring in the z direction (height variances) plus adjustment errors, and contains the maximum planarity errors of the measured sample across the entire measured surface, the positioning accuracy of the capture speckle compared with the illuminating speckles and the lack of imaging sharpness in the region of the edges of the illuminating speckle and capture speckle.

The AxisControl measuring system by the Heidelberg company uses a compact spectral measuring head with a two-dimensional drive across a planar sample sheet surface. The measuring head can not hover freely during measuring. The distance is controlled by mechanically placing the measuring head on the sample. The position of the control strip on the sheet must be manually determined with a light pen. The measuring technology is designed for spectral measurements without polarization filters only and typically requires a measuring field size of 5 mm×6 mm.

The Intellitrax measuring system by X-Rite Inc. combines a spectral color measuring head with a tracking sensor, which enables automatic tracking and positioning relative to the print control strip. The optical measuring system is designed so that it operates at a fixed distance from the test sample and must therefore tolerate the entire range of different paper thicknesses. When using standard 45°/0° geometry, the distance tolerances require there to be a correspondingly high peripheral distance between the illuminated and captured surface in the measurement field. For a broad range of paper thicknesses from 0 to in excess of 1 mm, this system restricts the size of the minimum measuring speckle and hence its use for detecting the smallest measurement fields without crosstalk.

Another measuring system is described in document DE 195 30 185 C2. In this known system, the problem of the distance is solved by creating an air cushion between the measuring head bottom edge and the paper surface, on which the measuring head hovers. A constant working distance is obtained by the air cushion irrespective of the paper thickness.

SUMMARY OF THE INVENTION

It is an objective of this invention to improve a scanner device of the generic type so that it is suitable for taking highly accurate measurements, without contact, of even the smallest measurement fields.

This objective is achieved by a scanner device for measuring the color properties of a measured object pixel by pixel by means of a color measuring head with a support surface for the measured object and a drive unit for moving the color measuring head above the support surface in at least one dimension thereof and for adjusting the height of the color measuring head in the direction perpendicular to the support surface, and having a measurement and drive control unit which activates the drive unit and co-operates with the color measuring head, characterized in that it has an electronic distance control system which adjusts the distance of the color measuring head above the measurement point in the direction perpendicular to the support surface to a desired measuring distance for every measurement point.

BRIEF DESCRIPTION OF THE DRAWINGS

The invention on the basis of the features defined in the characterizing part of independent claim I. Particularly advantageous embodiments and improved features are defined in the dependent claims.

The invention will be explained in more detail below with reference to the appended drawings. Of these.

DETAILED DESCRIPTION OF PREFERRED EMBODIMENTS

Figure 2:
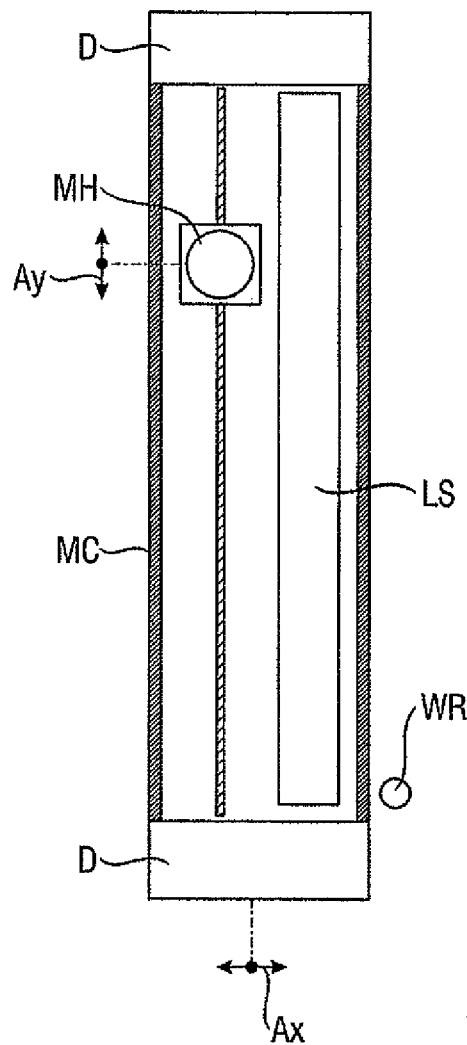
FIG. 2 is a partial longitudinal section parallel with the x-y co-ordinate plane through the measuring carriage of the scanner device.
Figure 3:
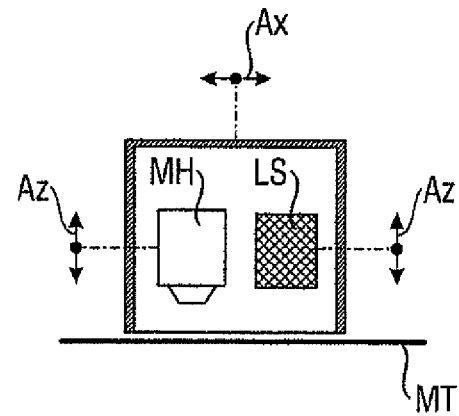
FIG. 3 is a partial cross-section parallel with the x-z co-ordinate plane through the measuring carriage of the scanner device.

In terms of its general construction, the scanner device proposed by the invention conforms to standard measuring apparatus, of the type typically used in the graphics industry for taking photoelectric measurements of printed sheets taken from a printing process on the basis of pixels. The scanner device comprises a sub-structure in the form of a measuring table MT with what is usually an inclined rectangular surface, on which the measured object S—the printed sheet to be measured—can be positioned. The measuring table therefore provides a support surface for the measured object. The printed sheet S typically contains a few (in this instance four, for example) graphic images P1-P4 and a (or several) color measuring strips CMS. In order to position the measured object S, stops are provided on the measuring table MT, although these are not illustrated. The measured object S is preferably secured on the measuring table MT by electrostatic means or by means of known suction mechanisms. Disposed on the measuring table MT is an elongate measuring carriage MC, on or in which a measuring unit is disposed, comprising a beam-shaped line scanner LS and an individual color measuring head MH which is preferably of a spectral design (FIGS. 2 and 3). The measuring carriage MC extends across the depth of the measuring table MT in the y co-ordinate direction and is driven by motor so that it moves linearly backwards and forwards across its width in the x co-ordinate direction, for which purpose appropriate drive and control units are provided on the measuring carriage MC and on or under the measuring table MT. In the drawings, the drive unit is only symbolically indicated by the letter D, and the measuring carriage MC moves in the x direction indicated by arrow Ax. Inside the measuring carriage MC, the line scanner LS and the color measuring head MH can be raised and lowered independently of one another in the z co-ordinate direction relative to the measurement table surface by means of conventional drive systems, not illustrated, as indicated by the arrows Az in FIG. 3. The color measuring head MH can also be moved in the direction of the y co-ordinate axis. These movement options are indicated by arrow Ay in FIG. 2. In conjunction with the movement of the measuring carriage MC in the x direction and the ability to move in the y and z directions, the color measuring head MH can be positioned above any and every image element of the measured object.

The line scanner LS is respectively able to measure a complete line of image pixels of the measured object S and is typically used to detect the image content of the measured object. The individual color measuring head MH is used to take highly accurate measurements of selected image pixels of the measured object and in particular measurement fields of color measuring strips (print control strips). All aspects of the line scanner are described in WO 2006/045621 A1 and it is not the subject matter of this invention.

Disposed on the measuring table MT parallel with the measuring carriage MC is a white reference strip WR. Also disposed on the measurement table close to the edge but still within the detection range of the color measuring head MH is a white reference tile WRK of long-term stability. These two white references are used to calibrate the measuring unit, as will be explained in more detail below.

The scanner device also has a processing device in the form of an external computer C with a keyboard K and a color monitor M. The computer C co-operates with a measurement and drive control unit MDC (FIG. 5) on the measuring table MT or in the measuring carriage MC and processes the measurement signals generated by the line scanner LS and color measuring head MH disposed in the measuring carriage MC and forwarded to it via the measurement and drive control unit MDC, and amongst other things, is also able to display the image data of the scanned measured object S on the monitor M. Via the measurement and drive control unit MDC, the computer C is also able to initiate and control the movements of the measuring carriage MC and the line scanner LS and color measuring head MH disposed in it in the three co-ordinate directions x, y and z.

Figure 4:
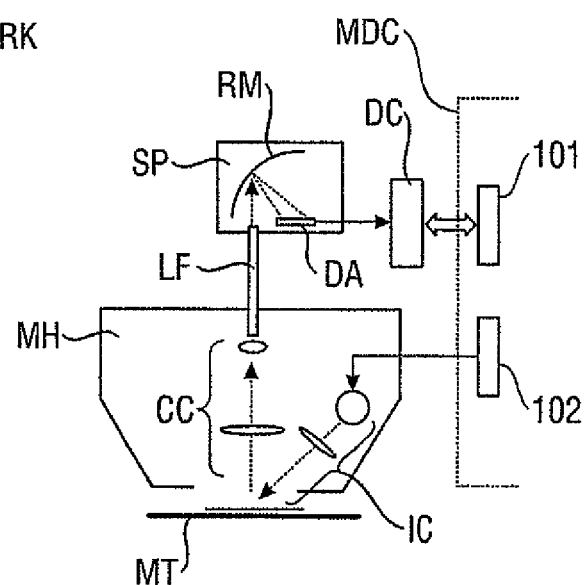
FIG. 4 is a schematic diagram showing the basic structure of the color measuring head of the scanner device.

FIG. 4 provides a schematic illustration of the basic construction of the individual color measuring head MH. It comprises an illuminating channel IC, a capture or measuring channel CC, a light guide (optical fiber or light-conducting rod) LF and a wavelength selective photoelectric converter, which in this instance is a spectrometer SP with a concave diffraction grating RM and a detector array DA (e.g. a diode line detector) and an electronic read-out DC for the detector array DA. The illuminating channel IC illuminates the measured object disposed on the measuring table MT in an illumination speckle at a (standardized) mean angle of incidence of 45 E (by reference to the normal onto the measured object at the measurement site), the collector channel CC captures the measurement light emitted by a measurement speckle on the measured object lying within the illumination speckle at a (standardized) capture angle range of 0 E+/−5-10 E (by reference to the normal onto the measured object at the measurement site) and couples it via a coupling optic into the light guide LF. The light guide LF directs the measurement light into the inlet gap of the spectrometer SP. In the spectrometer SP, the measurement light is split by the concave diffraction grating RM. The individual spectral elements of the measured light are locally resolved on reaching the detector array DA, where they are converted into corresponding electric signals. The electronic read-out DC reads the detector array DA and directs the spectral measurement signals to the sensor control unit 101 in the measurement and drive control unit MDC. Although not illustrated, the light source in the illuminating channel IC is activated by the lamp control unit 102 in the measurement and drive control unit MDC (FIG. 5).

In order to obtain minimum measurement times and a maximum scanning speed, it is of advantage to use a spectrometer which is able to take a simultaneous measurement of the spectral distribution. As illustrated, the spectrometer may be provided in the form of a grating-spectrometer with a diode line detector, which permits a spectral distribution in a diffraction order of the grating with a line or matrix detector. Alternatively, the spectrometer may also be equipped with a number of narrow-band bandpass filters disposed adjacent to one another upstream of the detector array. This naturally obviates the need for the diffraction grating.

Figure 5:
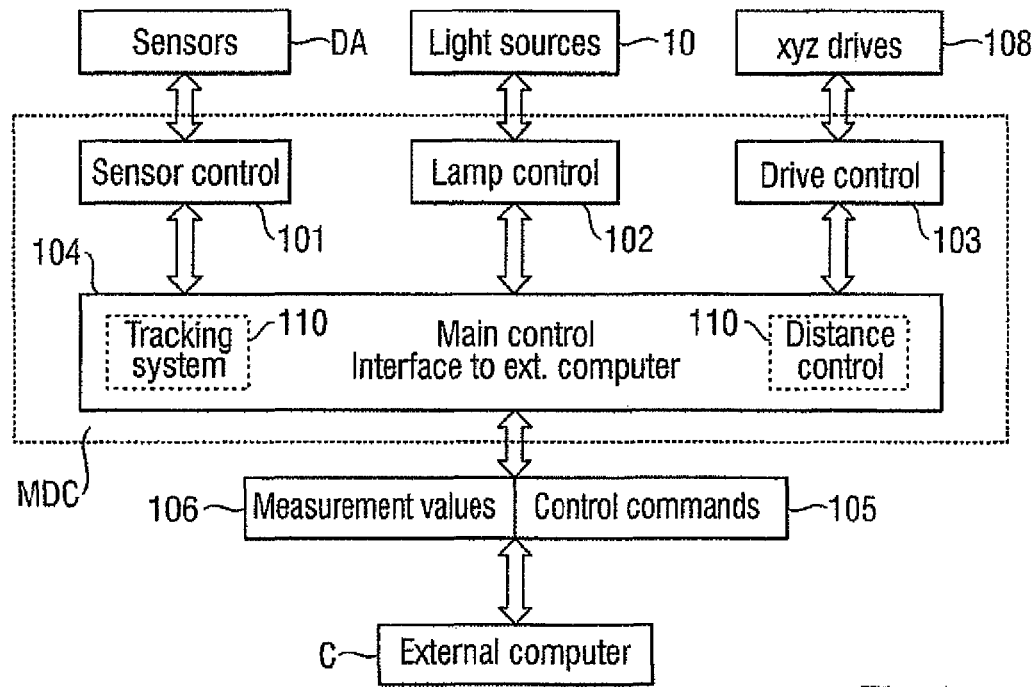
FIG. 5 is a block diagram illustrating how the measuring and control electronics of the scanner device operate, FIG. 6 plots measurement curves explaining how the correct measuring distance of the color measuring head above a measurement point is determined.

FIG. 5 illustrates the measurement and drive control unit MDC of the scanner device in the form of a rough block diagram. It comprises a sensor control unit 101, a lamp control unit 102 and a drive control unit 103, as well as a main control unit 104 which co-operates with the other three control units and simultaneously also establishes the connection to the external computer C. The sensor control unit 101 reads out the measurement values from the line scanner LS and color measuring head MH, the lamp control unit 102 controls the light sources of the line scanner LS and color measuring head MH and the drive control unit 103 controls drive motors 108 for moving the measuring carriage MC and the color measuring head MH disposed in it in the three directions of movement x, y and z. The main control unit 104 co-ordinates and controls the other three control units on a higher level and simultaneously also establishes the connection to the external computer C. The main control unit 104 receives control commands 105 from the external computer C and sends the (digitally processed) measurement values 106 generated by the line scanner LS and the color measuring head MH to the external computer. In terms of function, the measurement and drive control unit MDC is in principle the same as that of commercially available scanner devices of this type, and the specific functions necessary for activating the photoelectric converter and light sources of the line scanner LS and color measuring head MH may be taken directly from the specification sheets of the manufacturers of these elements. The person skilled in the art therefore needs no further explanation of how the measurement and drive control unit MDC operates.

Also contained in the main control unit 104 are a tracking system (tracking control for the color measuring head MH) and an active distance control system for adjusting the height of the color measuring head, which are symbolized by the two blocks 110 and 120 in FIG. 5. A more detailed explanation of these will be given below.

The scanner device illustrated in FIGS. 1-5 corresponds (with the exception of the distance control system 120) to the prior art as described in detail in the above-mentioned patent specification WO 2006/045261, for example. The mechanical construction and design of the motor-driven movements of the measuring carriage and line scanner and color measuring head are described in detail in U.S. Pat. No. 6,028,682 and the skilled person therefore needs no further explanation in this respect. It goes without saying that the measuring carriage MC may also be disposed parallel with the x co-ordinate direction, in which case all other orientations and directions of movement would likewise be rotated by 90 E accordingly.

This invention primarily relates to the distance control system of the individual color measuring head MH and related aspects. The invention therefore also relates to scanner devices which are equipped either with only one individual color measuring head MH or have another image scanner device instead of a line scanner. The invention further relates to simpler scanner devices, in which the color measuring head is able to move in only one dimension. However, such scanner devices will then require a precise mechanical stop for the edge of the printed sheet or an accurate system enabling the printer to position the printed sheet manually. The invention further relates to various special aspects of the scanner device which are important with a view to obtaining high-precision and above all fast measurements. Amongst others, these include said tracking control system and a special design of the white calibration system.

Figure 1:
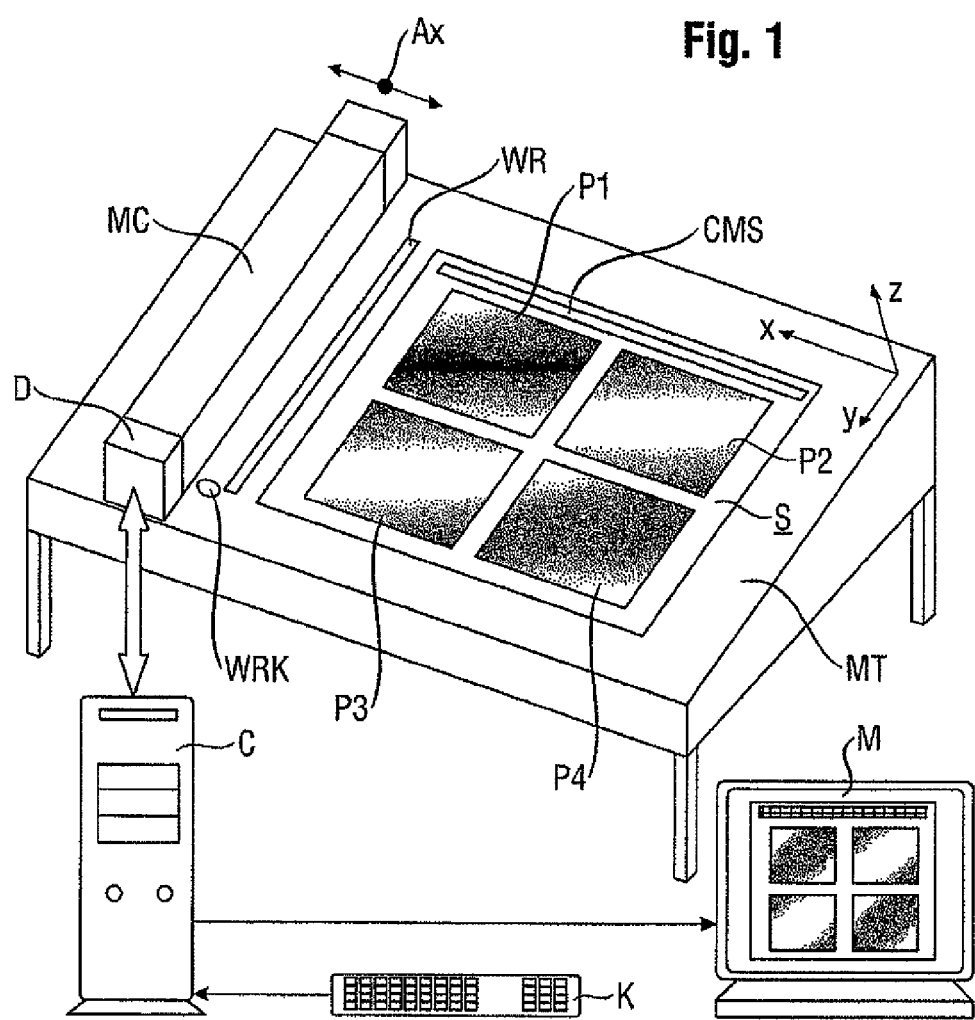
FIG. 1 shows a simplified overall view of one example of an embodiment of the scanner device proposed by the invention.

In order to function, the scanner device proposed by the invention must run an absolute white measurement. In the case of known scanner devices of this type, the absolute white measurement is usually obtained by moving a calibrated white reference to a point disposed on the measuring table and measuring it. In the case of the scanner device proposed by the invention, two different white references are used, namely the conventional white reference tile WRK of long-term stability, which is absolutely calibrated externally before being fitted and is disposed somewhere in the scanner device that is protected as far as possible from dirt (FIG. 2), and the white reference strip WR, which is mounted on a side of the measuring table MT across the entire side length (FIG. 1). It is not necessary to use a material of long-term stability for this strip. The reference values for the absolute white across the entire length of the white reference strip WR may be derived on the basis of a transfer measurement taken by the color measuring head MH from the white reference tile WRK.

To take the transfer measurement, the color measuring head firstly runs a white calibration on the white reference tile WRK. This corresponds to a measurement at the desired distance. The spectral calibration values of the white reference tile WRK (stored in the system) are correlated with the spectral measurement values. The color measuring head then measures the white reference strip WR at the desired distance at a number of positions distributed across the entire length. From these measurement values, a corresponding white spectrum is calculated by interpolation at every random position, which is used by the color measuring head for the subsequent white adjustment at this position.

Another alternative procedure is possible and is as follows. When setting up the print job, the printer or user pinpoints position of the print control strip for the color measuring head on a first printed sheet. This may be done by means of an optical position pointer, for example a laser pointer, which is integrated in the measuring head housing and illuminates the measurement sheet at a known position relative to the measuring position. During this procedure, the color measuring head firstly takes an absolute white measurement on the white reference tile WRK and then moves to the corresponding position above the white reference strip WR. At this position, the color measuring head then takes a measurement and fixes a local reference value. This position corresponds to the stationary position of the color measuring head for the entire print run. A white adjustment is run at this position before and/or after the measuring routine with every measurement of the sheet.

Once the transfer measurement has been run, other white measurements may be run during subsequent measuring routines on the white reference strip WR taking account of the transfer measurement, which takes place much faster because the measuring head does not have to move alongside the white reference tile WRK (normally disposed to the side of the scanning area). The transfer measurement must be repeated at regular intervals in time in order to compensate for the effect of dirt.

By virtue of one essential aspect of the invention, the correct measuring distance in the z direction with respect to the white reference strip WR and also with respect to the white reference tile WRK is determined by a series of measurements at different heights and a determination of the desired distance based on a criterion. The criterion selected might be the mid-point of the height range (z range) at which the variation of all measurement values measured in this range is minimal. This process of determining the correct measuring distance (desired measuring distance) is also described in more detail below with reference to FIG. 6. However, the white reference strip WR may also be measured with the measuring head at the desired distance above the printed sheet and the measurement result corrected by computation. This will be explained in more detail below.

Similarly to the known Intellitrax system mentioned above, the scanner device proposed by the invention is preferably equipped with a tracking control system (tracking system) for the color measuring head MH. The racking control system is operated on the basis of a program in the main control unit 104 of the measurement and drive control unit MDC and is symbolized by block 110 in FIG. 5. It is able to evaluate the measurement signals of the line scanner LS in order to locate the print control strip CMS on the printed sheet S, for example. However, it is preferable to provide a separate, short miniature line scanner for the tracking control system which is mounted on the color measuring head MH and moves with it, the signals of which are likewise evaluated by the measurement and drive control unit MDC. The tracking control system enables the lateral measuring position to be actively controlled with respect to the longitudinal direction of the print control strip on the printed sheet when the color measuring head is taking measurements.

When setting up a new print job, the printer must position the color measuring head in the scanner device on a one-off basis so that the print control strip on the sheet is disposed in the capture range of the tracking control system. The color measuring head is then disposed in this stand-by position with the measuring orifice above the white reference strip WR in readiness for running continuous white measurements. During a subsequent measuring run, the printer then merely has to place the sheet with the print control strip within the capture range of the tracking control system. The color measuring head can then automatically take the measurement with a minimal travel time. The time needed to take a white measurement of the pixel-based white reference tile WRK is dispensed with. An automatic white adjustment is run on the strip before and after the series of scanning measurements. A level drift of the measuring system as a function of time can be detected from the two white measurements and also compensated between the two measurement values by interpolation.

As mentioned above, in order to take high-precision measurements, it is important to keep the peripheral distance between the illuminating and measurement speckles of the color measuring head MH on the measured object S as small as possible. In the case of the 45E/0E measuring geometry used, the size of the peripheral distance depends on the sum of all variances which occur in the z direction (height variances) plus adjustment errors, and contains the maximum planarity error of the measurement bed (bed surface or measuring table MT) across the entire measurement surface, the positioning accuracy of the capture speckle relative to the illuminating speckles and the imaging sharpness in the region of the edges of the illuminating speckle and capture speckle.

For reasons of cost, it is common practice not to place too high a specification on the planarity of the support surface (measuring table MT) when working with bigger print formats. However, since this increases the peripheral distance between the illuminating speckle and the capture speckle accordingly, the scanner device is equipped with an electronic distance control system in the measurement and drive control unit MDC by virtue of a main aspect of the invention. The distance control system measures the fluctuations in distance from the bed by means of a distance sensor attached to the housing of the color measuring head, for example, and initiates a distance correction with the drive in the z direction accordingly, so that the color measuring head MH is disposed at the same (desired) distance above the bed (the measuring table) at every point.

By virtue of another aspect of the invention, it may also be preferable for the active distance control system to operate without constantly taking a distance measurement by means of a distance sensor. To this end, when preparing to switch on the scanner device, the planarity of the support surface (measuring table MT) is measured by reference to the mechanical holder of the color measuring head MH at a number of measurement points across the entire measuring table surface. The measurement points may be selected so that they form a regular measurement pattern, for example. The distances of the measurement points in the measurement pattern are selected depending on the local pitch of the distance variation and the required accuracy. The co-ordinates (x, y) of the measurement points as well as the determined distances (absolute heights) of the color measuring head at the correct desired measuring distance above the measurement points are stored in the measurement and drive control unit MDC as planarity values. To a certain extent, they constitute a height and depth profile of the surface of the measuring table with respect to a reference plane based on the two axes of movement x and y of the color measuring head MH. By means of a numerical interpolation between the measurement points of the measurement pattern, a corresponding desired height of the color measuring head can be calculated for every position of the measuring table or its surface and then used to control the distance.

Whilst the scanner device is being prepared, the distances (heights) may be measured by means of a distance sensor, which is temporarily attached to the holder of the color measuring head MH. By virtue of another aspect of the invention, however, these height or distance measurements may be taken by the color measuring head MH itself. The advantage of this method is that the planarity measurement can be repeated at a later point in time if necessary, without additional auxiliary means.

Figure 6:
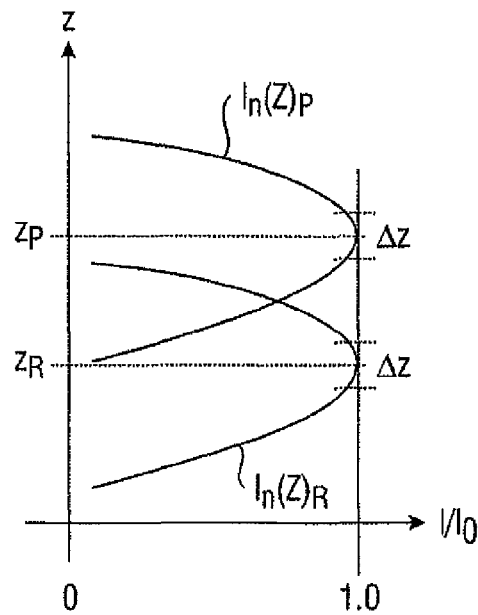

For this design of the distance control system which will be explained with reference to FIG. 6, different height positions z varied in small stages respectively are measured at every measurement point of the signal level generated by the color measuring head MH. The height is adjusted in the z direction by means of the drive control unit 108. The series of measurements of the signal level I is normalized at every position with respect to the respective maximum value $I_0$. The curves of the signal level normalized as a function of the z position are identical at every measurement point. In FIG. 6, two such normalized curves $I_n(z)_R$ and $I_n(z)_P$ are plotted for two measurement points R and P respectively. The absolute desired height of the color measuring head MH corresponding to the desired measuring distance is now clearly determined at every measurement point of the measurement pattern on the basis of an identical criterion. To this end, one option is to set the desired height as being the mean z value of a z-range Az fixed in terms of its width, where the z position of the z-range Az is determined so that the variation of the (normalized) signal level lying within it is minimal. In FIG. 6, $z_R$ and $z_P$ denote the mean z values for the two measurement points R and P determined in this manner. The corresponding mean z values at each measurement point then give the absolute desired heights of the color measuring head above the measurement points (on the measuring table surface) and are stored as described together with the x, y co-ordinates of the measurement points of the measuring pattern for subsequent use in the active z-adjustment of the color measuring head MH to the correct desired measuring distance.

Only planarity errors of the measuring table surface are compensated by the active height and distance control system described above, but not the different thicknesses of the measured object (paper thicknesses). The distance control system is equipped with a paper thickness correction function for the latter purpose.

When setting up the print run, the distance control system determines the paper thickness used on the first printed sheet to be measured. To this end, the color measuring head automatically moves to a (random) position on the printed sheet. The desired height of the color measuring head is then determined in the z direction in which the color measuring head should be positioned at the correct desired measuring distance above the surface of the printed sheet. This can be done by running the measurements described above with the color measuring head at different height settings and the series of measurements generated is used to determine the height (z position) of the color measuring head corresponding to the correct desired measuring distance. The z difference between this height and the desired height for the point on the measuring table surface lying underneath (determined during the planarity measurement) gives the paper thickness.

At the start of the operation of measuring subsequent printed sheets, the color measuring head is in the stand-by position at the desired height above the white reference strip WR belonging to the correct desired measuring distance. In the acceleration phase of the scanning movement between the white reference strip WR and printed sheet S, the distance control system corrects the height position of the color measuring head (whilst simultaneously compensating for the planarity) for the paper thickness so that the measurements, which lie above the printed sheet, can be taken at the correct desired measuring distance. The setting or adjusting movement of the color measuring head MH to the height needed for the correct desired measuring distance may alternatively be effected in the same way as with the planarity measurement by means of a conventional distance sensor and a control system activated by it. However, this requires additional equipment.

In one particularly practical alternative approach, the color measuring head may also be disposed in the stand-by position at the start of the measurement run at a height which corresponds to the correct desired measuring distance at the leading edge of the printed sheet. Accordingly, the stand-by position is in front of the white reference strip WR in the x direction. When the color measuring head moves above the white reference strip, the white measurement (is usually) taken at an "incorrect" height. To ensure that a quantitatively correct white measurement can nevertheless be taken, the measurement which was taken at the incorrect height must be converted into a measurement result corresponding to the correct height above the white reference strip WR. A correction factor for each spectral measurement value is needed for this purpose. The correction factors may be determined from the (spectral) height-intensity function (FIG. 6) run during the focusing measurement on the white reference strip. This measurement at the incorrect height above the white reference strip is of practical advantage in particular if the color measuring head is fitted with the miniature line scanner as a tracking sensor mentioned above. In practical terms, it is disposed in the x direction at a distance of approximately 10 cm from the measuring speckle of the color measuring head, i.e. the measurement of the tracking sensor is ahead of the measuring speckle of the color measuring head. Had the white reference strip been measured with the color measuring head at the correct desired height, this would have meant that the tracking sensor running ahead would start scanning the printed sheet at an incorrect height under certain circumstances. This would make it more difficult or impossible to obtain a correct "line-up" on the color measuring strip in some situations.

Figure 8:
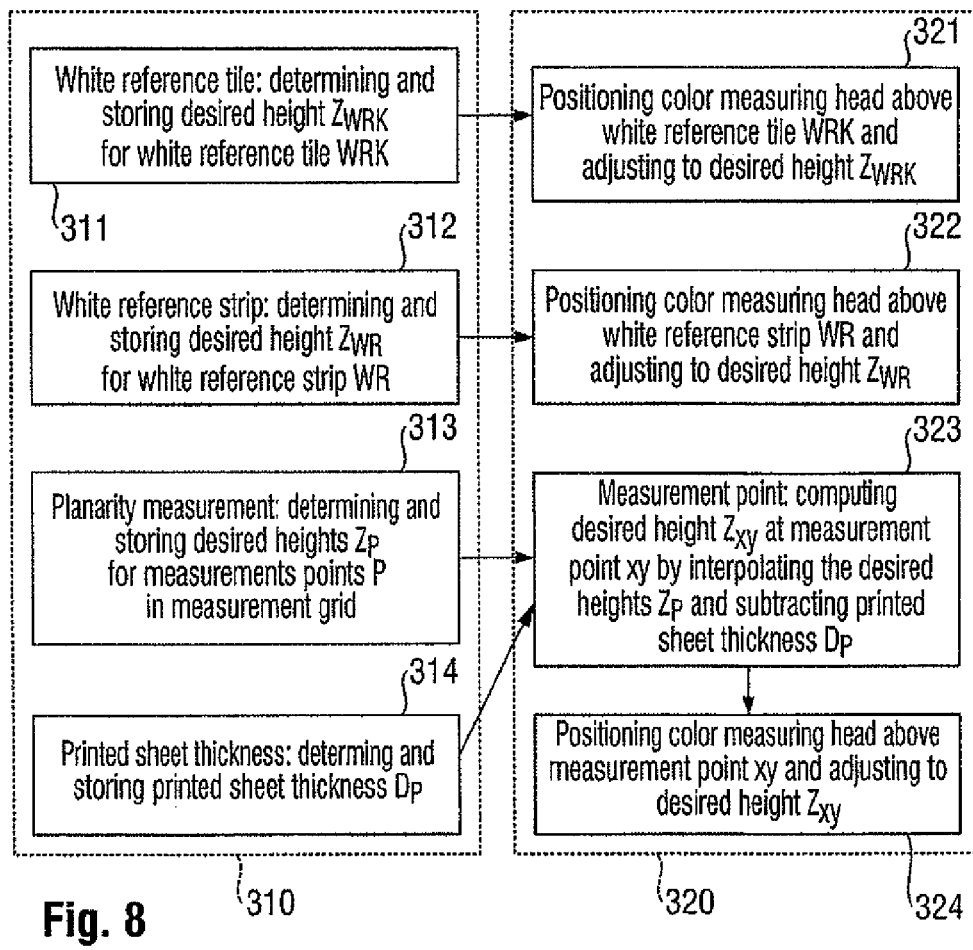
FIG. 7 is a block diagram illustrating how the correct measuring distance of the color measuring head is determined and FIG. 8 is a block diagram showing an active height or distance control procedure for the color measuring head.
Figure 7:
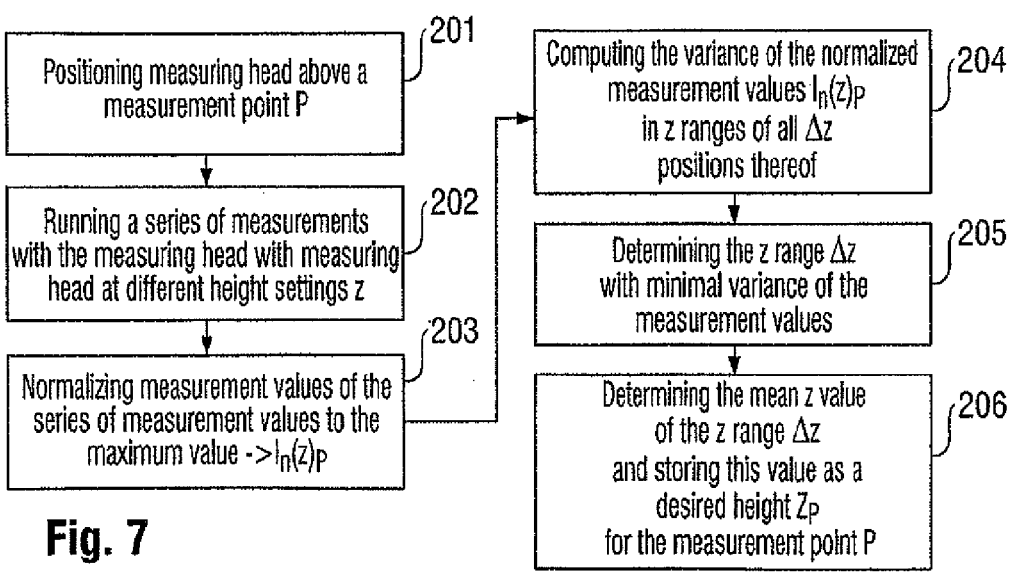

FIGS. 7 and 8 illustrate the individual steps of the active height or distance control procedure described above, again providing an overall view in the form of a block diagram.

As illustrated in FIG. 7, in order to determine the desired height of the color measuring head above a measurement point P, the color measuring head MH is positioned above the measurement point (block 201).

The color measuring head is then set to different heights z and a measurement is taken at every height z (block 202). The series of measurements obtained as a result is normalized to its maximum value (Block 203). The variance of the normalized measurement values for z ranges $\Delta z$ is then calculated for all the possible z positions of these ranges (block 204). The z range for which the variance is minimal is then determined (block 205). Finally, the mean z value of this z range with the minimal measurement value variance is finally determined and stored as a desired height $z_P$ for the relevant measurement point P (block 206).

FIG. 8 illustrates how the active height and distance control system operates. It comprises two groups of functions, respectively grouped by boxes 310 respectively 320. The preparatory function steps are contained in box 310 whilst box 320 contains the actual control steps which take place during the different measuring routines.

In block 311, the desired height $z_{WRK}$ of the color measuring head above the white reference strip WRK is determined and stored, following the routine of FIG. 7.

In the same way, the desired height $z_{WR}$ of the white reference strip WR is determined and stored in block 312. If necessary, several desired heights may also be determined at different positions of the white reference strip.

The planarity measurement of the measuring table surface takes place in block 313, whereby the desired heights $z_P$ of the color measuring head are determined on the basis of a grid of measurement points P on the measuring table surface and stored. Here too, the procedure is as illustrated in FIG. 7.

In block 314, finally, the thickness $D_P$ of the printed sheet to be measured is determined and stored. This also takes place in the manner illustrated in FIG. 7.

After these preparatory measurements or steps, the scanner device is ready for taking the actual measurements.

In order to measure the white reference tile WRK, the color measuring head is positioned above it and adjusted to the stored desired height $z_{WRK}$ (block 321). The white measurement is then taken.

In order to measure a point of the white reference strip WR, the color measuring head is positioned above this point and adjusted to the desired height $z_{WR}$ stored for this point (block 322). The white measurement is then taken.

In order to measure a measurement point of the printed sheet with the co-ordinates xy, the requisite desired heights $z_P$ of the grid points P are calculated taking account of (subtracting) the thickness $D_P$ of the printed sheet (block 323). The color measuring head is then moved to the measurement point xy and as it is so is simultaneously set to the calculated desired height $z_{xy}$ (block 324). The measurement point xy is then measured.

The function blocks schematically illustrated in FIGS. 7 and 8 are implemented based on programs and are run in the measurement and drive control unit MDC of the scanner device, where they are symbolized by block 120 (FIG. 5). However, it would also be possible for these functions to be run in the external computer C, in which case the measurement and drive control unit MDC of the scanner device is activated accordingly.

For reference purposes, the designations set forth in FIGS. 7 and 8 may be summarized as follows:

FIG. 7

201 Positioning measuring head above a measurement point P

202 Running a series of measurements with the measuring head with measuring head at different height settings z 203 Normalizing measurement values of the series of measurement values to the maximum value–<$I_n(z)_P$ 204 Computing the variance of the normalized measurement values $I_n(z)_P$ in z ranges of all Δz positions thereof 205 Determining the z range Δz with minimal variance of the measurement values 206 Determining the mean z value of the z range Δz and storing this value as a desired height $z_P$ for the measurement point P.

FIG. 8

311 White reference tile: determining and storing desired height $z_{WRK}$ for white reference tile WRK 312 White reference strip: determining and storing desired height $z_{WR}$ for white reference strip WR 313 Planarity measurement: determining and storing desired heights $z_P$ for measurements points P in measurement grid 314 Printed sheet thickness: determining and storing printed sheet thickness $D_P$ 321 Positioning color measuring head above white reference tile WRK and adjusting to desired height $Z_{WRK}$ 322 Positioning color measuring head above white reference strip WR and adjusting to desired height $z_{WR}$ 323 Measurement point: computing desired height $z_{xy}$ at measurement point xy by interpolating the desired heights $z_P$ and subtracting printed sheet thickness $D_P$ 324 Positioning color measuring head above measurement point xy and adjusting to desired height $z_{xy}$ This present patent application is based on European Patent Application No. 06 126 912.2, filed Dec. 21, 2006 with the European Patent Office, the contents and disclosure of which is hereby incorporated by reference herein in its entirety.

The invention claimed is:

1. Scanner device for measuring the color properties of a measured object pixel by pixel, comprising:
   a color measuring head,
   a support surface for the measured object,
   a drive unit for moving the color measuring head above the support surface in at least one dimension thereof and for adjusting the height of the color measuring head in a direction perpendicular to the support surface,
   a measurement and drive control unit which activates the drive unit and co-operates with the color measuring head, and
   an electronic distance control system which adjusts the distance of the color measuring head above the measurement point in the direction perpendicular to the support surface to a desired measuring distance for every measurement point.

2. Scanner device according to claim 1, wherein the distance control system takes a planarity measurement of the support surface and stores the planarity measurement values $z_P$ obtained as a result, and adjusts the distance of the color measuring head taking account of the stored planarity values.

3. Scanner device according to claim 2, wherein for the planarity measurement, the distance control system determines the desired heights $z_P$ of the color measuring head in a grid of measurement points distributed across the support surface from above these measurement points and stores them as planarity measurement values $z_P$.

4. Scanner device according to claim 1, wherein the distance control system takes a measurement of and stores the thickness of the measured object and adjusts the distance of the color measuring head taking account of the stored thickness of the measured object.

5. Scanner device according to claim 4, wherein in order to measure the thickness of the measured object, the distance control system determines the desired height of the color measuring head above a measurement point on the measured object and the desired height of the color measuring head above a point lying on the support surface underneath this measurement point and stores the difference between these two desired heights as the thickness of the measured object.

6. Scanner device according to claim 1, wherein the distance control system determines the desired height of the color measuring head at a measurement point derived from measurement values measured with the color measuring head at different height settings thereof at the measurement point.

7. Scanner device according to claim 6, wherein the distance control system determines the height setting of the color measuring head in the vicinity of which the measurement values measured with the color measuring head vary least as being the desired height of the color measuring head at a measurement point.

8. Scanner device according to claim 1, further comprising a tracking control system for the color measuring head which detects the position of a track to be scanned on the measured object and guides the color measuring head along this track.

9. Scanner device according to claim 1, further comprising a calibrated white reference tile of long-term stability and a white reference strip disposed on the support surface, wherein the measurement and drive control unit is designed to run the white calibration of the scanner device on the basis of white measurements on the white reference strip, and these white measurements are calibrated by means of transfer measurements taken on the white reference tile beforehand.

10. Scanner device according to claim 1, further comprising a white reference strip disposed on the support surface, wherein the measurement and drive control unit is designed to correct by computation measurement values measured by the color measuring head at a distance at variance with the correct desired measurement distance so that they correspond to white measurement values measured at the correct desired measuring distance.

* * * * *